(12) United States Patent
Debaisieux et al.

(10) Patent No.: US 11,440,641 B2
(45) Date of Patent: Sep. 13, 2022

(54) AIRCRAFT WING COMPRISING A MOBILE LEADING EDGE FLAP DRIVEN BY A LINEAR ELECTRIC MOTOR

(71) Applicant: SONACA S.A., Gosselies (BE)

(72) Inventors: Stéphane Debaisieux, Sart-Dames-Avelines (BE); Steve Sciarrabone, Lobbes (BE)

(73) Assignee: SONACA S.A., Gosselies (BE)

( * ) Notice: Subject to any disclaimer, the term of this patent is extended or adjusted under 35 U.S.C. 154(b) by 465 days.

(21) Appl. No.: 16/345,767

(22) PCT Filed: Nov. 2, 2017

(86) PCT No.: PCT/EP2017/078002
§ 371 (c)(1),
(2) Date: Apr. 29, 2019

(87) PCT Pub. No.: WO2018/083144
PCT Pub. Date: May 11, 2018

(65) Prior Publication Data
US 2020/0055589 A1    Feb. 20, 2020

(30) Foreign Application Priority Data

Nov. 4, 2016 (BE) .................................. 2016/5822

(51) Int. Cl.
*B64C 13/50* (2006.01)
*B64C 9/02* (2006.01)
(Continued)

(52) U.S. Cl.
CPC ............... *B64C 13/50* (2013.01); *B64C 9/02* (2013.01); *B64C 9/22* (2013.01); *H02K 7/14* (2013.01); *H02K 41/031* (2013.01)

(58) Field of Classification Search
CPC .. B64C 13/50; B64C 9/02; B64C 9/22; H02K 7/14; H02K 41/031
See application file for complete search history.

(56) References Cited

U.S. PATENT DOCUMENTS 4,399,970 A     8/1983  Evans
5,686,907 A *  11/1997  Bedell ................ B64D 45/0005
                                                              324/207.13
(Continued)

FOREIGN PATENT DOCUMENTS

DE   10 2014 101276 A1   8/2015
EP        0 818 387 A    1/1998
(Continued)

OTHER PUBLICATIONS

Translation of EP2116467A1 (Year: 2009).*
(Continued)

*Primary Examiner* — Richard R. Green
*Assistant Examiner* — Steven J Shur
(74) *Attorney, Agent, or Firm* — Pearne & Gordon LLP

(57) ABSTRACT

The invention relates to an aircraft wing comprising a stationary central wing body as well as at least one mobile leading edge flap intended for being moved relative to the stationary central body between an extended position and a retracted position, the wing comprising a device for moving the mobile leading edge flap, the device being provided with at least one mobile drive rail including a front end connected to the mobile flap. According to the invention, the movement device comprises a linear electric motor including: a primary assembly provided with at least one stationary carriage comprising coils, the primary assembly being rigidly connected to the stationary central body of the wing; and a mobile secondary assembly including a magnetic track arranged on the drive rail.

5 Claims, 2 Drawing Sheets

(51) Int. Cl.
*B64C 9/22* (2006.01)
*H02K 7/14* (2006.01)
*H02K 41/03* (2006.01)

(56) References Cited

U.S. PATENT DOCUMENTS

| | | |
|---|---|---|
| 6,776,580 B2 | 8/2004 | Fink et al. |
| 2016/0226349 A1* | 8/2016 | Mastrocola ............ H02K 11/21 |
| 2017/0217569 A1 | 8/2017 | Gueuning et al. |
| 2018/0194457 A1 | 7/2018 | Gueuning et al. |

FOREIGN PATENT DOCUMENTS

| | | | |
|---|---|---|---|
| EP | 2 116 467 A1 | 11/2009 | |
| EP | 2116467 A1 * | 11/2009 | ............... B64C 9/24 |
| EP | 2 505 493 A1 | 10/2012 | |
| EP | 3 029 819 A1 | 6/2016 | |
| KR | 2008 0035538 A | 4/2008 | |

OTHER PUBLICATIONS

International Search Report for International Application No. PCT/EP2017/078002 dated Feb. 8, 2018.
Written Opinion for International Application No. PCT/EP2017/078002 dated Feb. 8, 2018.
Preliminary Belgium Search Report for BE Application No. 2016/5822.

* cited by examiner

AIRCRAFT WING COMPRISING A MOBILE LEADING EDGE FLAP DRIVEN BY A LINEAR ELECTRIC MOTOR

TECHNICAL FIELD

The present invention relates to the field of aircraft wings, of the type comprising a fixed central wing body carrying one or more mobile leading edge flaps, also called "Slats".

It is noted that the invention applies to all the types of aircraft, such as a flying wing, an airplane with an engine in the tail of the fuselage, a supersonic airplane, etc.

PRIOR ART

In aircraft, each of the two wings of the lift-generating surface is generally provided with high-lift mobile flaps, mounted on the leading edge and on the trailing edge of the wing.

In a known manner, the flaps are deployed for the phases of landing and take-off in order to increase the lift at a low or average speed. Moreover, in cruising flight at high speed, the mobile flaps are retracted in order to limit the resistance to the forward movement of the aircraft. Furthermore, again in a manner known to a person skilled in the art, the movement of each flap is carried out using means housed substantially in a front or rear portion of a fixed central wing body, as is in particular known from the document EP 0 818 387. These means allow to move each mobile leading edge flap according to a trajectory usually in the shape of an arc of a circle with respect to the fixed central wing body, between a retracted position in which the flap substantially conforms to the shape of the fixed body, and a deployed position in which this flap is moved forward.

More precisely, as is clear from the document EP 0 818 387, each mobile leading edge flap is equipped with a device ensuring its movement, this device comprising a first and a second drive rail spaced apart in a direction of wingspan of the wing, and each comprising a front end connected to the mobile flap. These two drive rails are coupled with movement means, for example of the type drive shaft carrying pinions driven in rotation and respectively cooperating with racks provided on the drive rails.

Although this configuration is very widespread in aircraft wings, the design proposed can still be improved, in particular with regard to the footprint of the movement device, but also its mass, its reliability and its precision.

DISCLOSURE OF THE INVENTION

The goal of the invention is therefore to at least partially overcome the disadvantages mentioned above, relative to the realisations of the prior art.

To do this, the object of the invention is first of all an aircraft wing comprising a fixed central wing body, as well as at least one mobile leading edge flap intended to be moved relative to said fixed central body between a deployed deposition and a retracted position, the wing comprising a device for movement of the mobile leading edge flap, said device being equipped with at least one mobile drive rail comprising a front end connected to the mobile flap.

According to the invention, said movement device comprises a linear electric motor comprising:
- a primary assembly equipped with at least one fixed truck comprising coils, the primary assembly being rigidly connected to the fixed central body of the wing; and
- a mobile secondary assembly comprising a magnetic pathway arranged on the drive rail.

The invention thus lies in the ingenious and innovative integration of a linear electric motor into the wing, in order to ensure the movement of the mobile leading edge flap. The movement of the drive rail(s) is thus carried out directly, via the judicious placement of the magnetic pathway on this/these same drive rail(s) of a mobile nature. This allows to reduce the mass and the footprint of the movement device, while also reducing the geometric constraints of implantation of this device as well as the maintenance needs. Moreover, the elimination of mechanical transmission elements allows to reduce the acoustic nuisances and reinforces the reliability and the service life of the movement device, which also provides excellent precision.

Moreover, the invention offers the possibility of electronic control which provides additional operational flexibility with respect to the realisations of the prior art. In particular, control can be carried out dynamically during the flight phases of take-off and landing, and optionally in cruising phase, in association with sensors and a system for control of the quality of the aerodynamic flow around the aerofoils. The speed of movement of the flaps can also be controlled, with the positive consequence of a possible gain in aerodynamic performance. Likewise, the integration of the function of identifying the position of the rail(s) in the electromagnetic system allows in particular to detect possible cases of blockage. In this respect, it is noted that this electronic control also allows to eliminate the existing systems for control and correction of offset ("skew sensor"), which participates in the reduction of the overall mass of the movement device.

Finally, it is specified that the proposed design adapts perfectly to the existing solutions, which can be modified accordingly in order to take advantage of all of the advantages provided by the invention.

Preferably, the primary assembly comprises at least two fixed trucks spaced apart from each other along the mobile drive rail, even if a single truck or a greater number of trucks could be adopted, without going beyond the context of the invention.

Preferably, said drive rail is guided by the fixed truck. Nevertheless, additional or alternative guide elements could be implemented, without going beyond the context of the invention. These could be for example guide means fastened onto the fixed central body of the wing, and designed in such a way as to stress the drive rail in question into movement, according to a desired trajectory such as a trajectory in the shape of an arc of a circle centred on a flap axis of rotation, when the rail is moved by the linear electric motor. Typically, these guide means comprise roller systems housed in the front portion of the fixed central wing body, these rollers thus being arranged in such a way as to guide the rails along the desired trajectory.

Finally, the object of the invention is also an aircraft comprising at least one wing as described above, this same wing being preferably equipped with a plurality of mobile leading edge flaps.

Other advantages and features of the invention will appear in the non-limiting detailed description below.

BRIEF DESCRIPTION OF THE DRAWINGS

This description will be made in relation to the appended drawings among which.

DETAILED DISCLOSURE OF PREFERRED EMBODIMENTS

Figure 1:
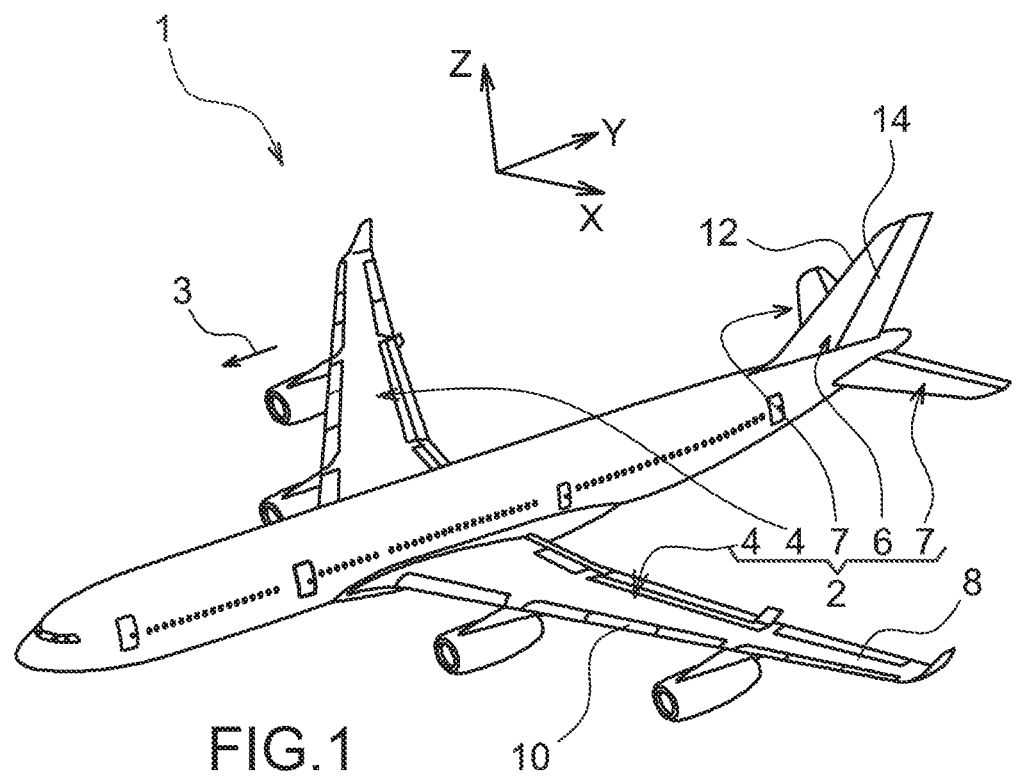
FIG. 1 shows a perspective view of an aircraft.

In reference first of all to FIG. 1, an aircraft 1 having a lift-generating surface 2 consisting of a plurality of lift-generating surface elements, also called aerodynamic aerofoils, is shown.

Throughout the description below, the terms "front" and "rear" are to be considered with respect to a direction of forward movement of the aircraft encountered after the thrust exerted by the engines of the aircraft, this direction being schematically shown by the arrow 3.

Among the lift-generating surface elements of the aircraft 1, there are two main wings, called wings 4, a vertical stabilizer 6, and two horizontal empennages 7 located at the rear of this aircraft.

With regard to the wings 4, as mentioned above, they each comprise a fixed central wing body 8, also called main central portion, this body constituting almost the entirety of the wing, and being located to the rear of a leading edge 10. Throughout the following description, by convention, X corresponds to the longitudinal leading-edge direction or wingspan direction, Y corresponds to the direction oriented transversely with respect to the leading edge 10, and the direction Z corresponds to the vertical direction, these three directions being orthogonal to each other.

Figure 2:
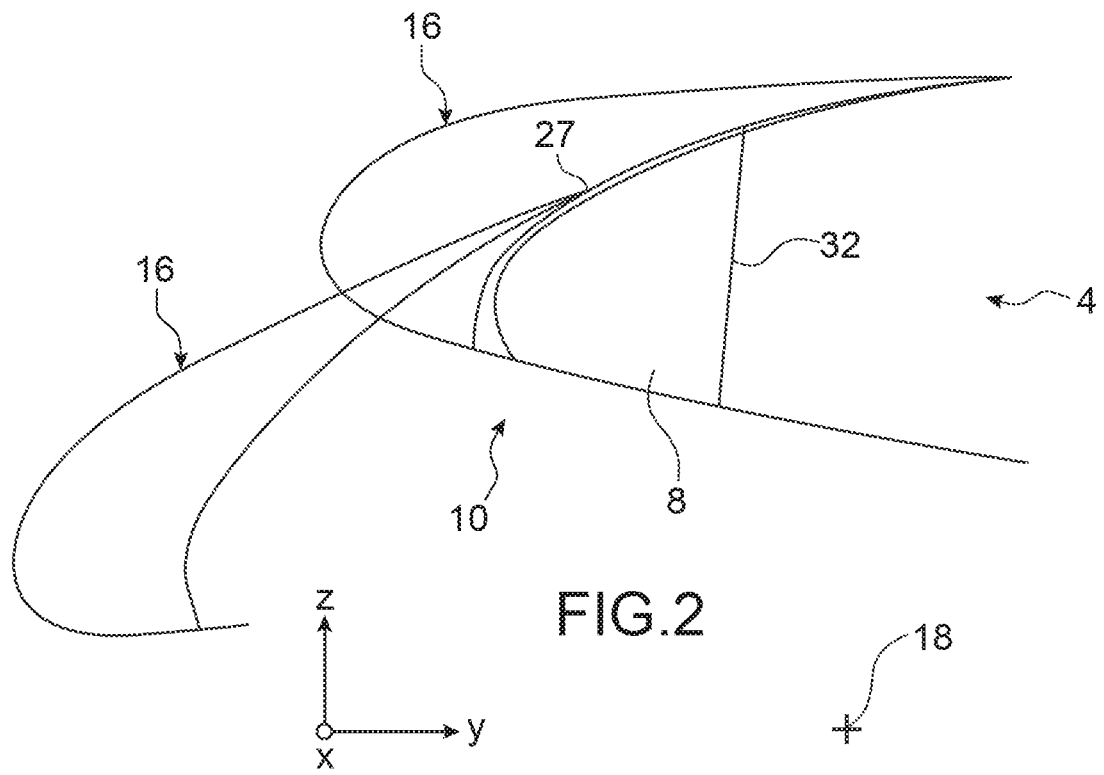
FIG. 2 shows a schematic and partial cross-sectional view of an aircraft wing according to the present invention, provided with a mobile leading edge flap.

As shown schematically in FIG. 2, it is the leading edge 10 of each of the two wings 4 which can be equipped with at least one mobile leading edge flap 16, called "Slat". Each of these flaps 16 is intended to be connected to the body 8 by means that will be described in detail below. In this FIG. 2, it is shown that the mobile leading edge flap 16 (shown schematically) can occupy a retracted/withdrawn position in which it is flush with the front portion of the fixed central body 8 of the wing 4. In such a case, the mobile flap 16 is its most rearward position. Moreover, the mobile flap 16 can occupy an entirely deployed position in which it is at a distance towards the front of the fixed central body 8, this entirely deployed position being adopted in particular during the phases of take-off and landing in order to increase the lift at low or medium speed. This flap 16 is of course designed to be moved between these two extreme positions, for example in such a way as to make it adopt an intermediate take-off position, known to a person skilled in the art.

For informational purposes, the mobile flap 16 extends for example over substantially the entire length of the wing 4 in question, of course in the wingspan direction of this wing 4, or only over just a portion of this wing, as is most common on aircraft.

Figure 3:
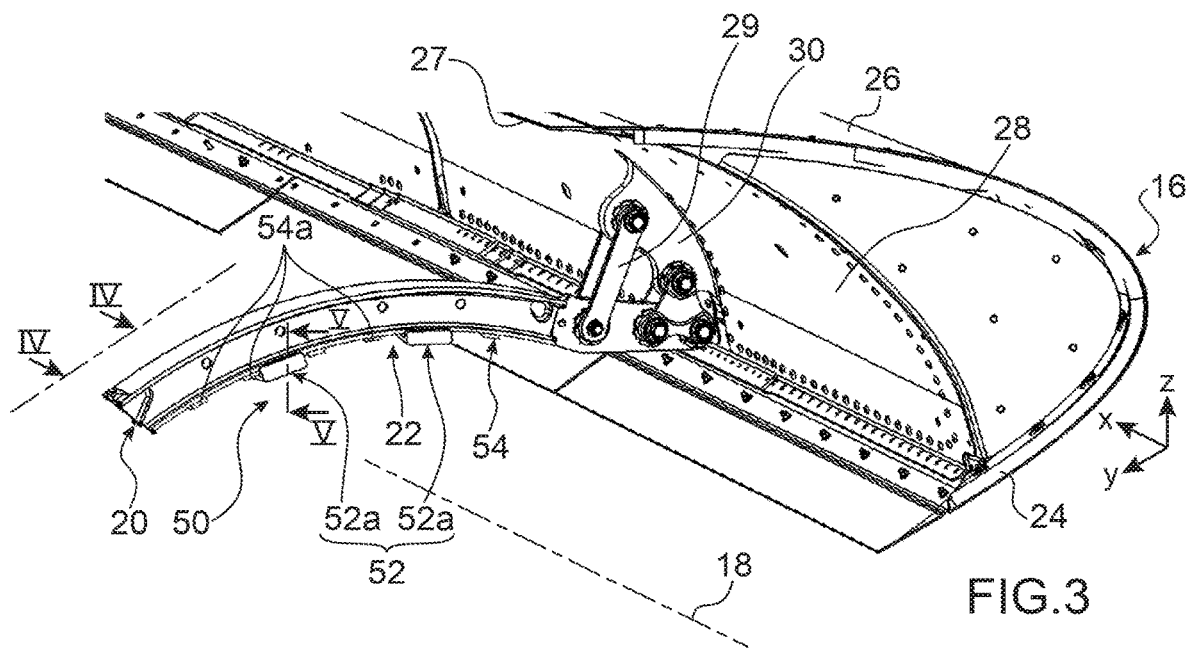
FIG. 3 shows a partial perspective view of the mobile leading edge flap shown in FIG. 2.
Figure 4:
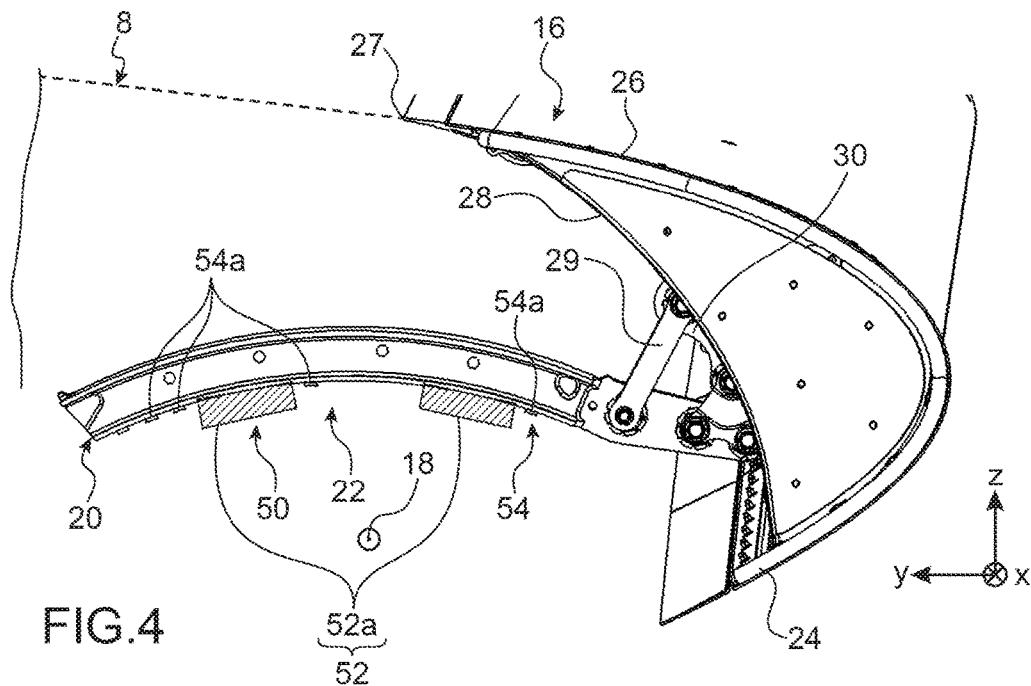
FIG. 4 shows a cross-sectional view taken along the line IV-IV of FIG. 3.

As visible in FIGS. 3 and 4, the flap 16 comprises an aerodynamic coating defining a lower-surface portion 24 and an upper-surface portion 26, the latter ending in a trailing edge 27 of the flap. Moreover, it is closed towards the rear by a closing coating 28, intended to conform to the fixed wing body 8 when it occupies the retracted position.

Again in reference to FIGS. 3 and 4, the wing comprises a device for movement of the mobile leading edge flap 16, this device 50 allowing to pivot the latter with respect to the body 8, about an axis of rotation 18, between the entirely deployed position and the retracted position.

The movement device comprises first of all at least one drive rail 20 arranged in a plane transverse to the flap. In the preferred case in which there is a plurality of rails 20, the latter are then spaced apart from each other in the wingspan direction X.

Each drive rail 20 has a mobile nature, since it is intended to be rotated about the axis 18, as will be detailed below. It has a general shape that is curved or is an arc of a circle, known to a person skilled in the art and centred on the axis of rotation 18.

The front end of each drive rail 20 is connected to the flap 16 by a flap fitting 30 that protrudes rearward from the closing coating 28, an additional connecting rod 29 being arranged between this same fitting 30 and a more rearward point of the front end of the rail 20.

One of the particularities of the invention lies in the means for movement of the rail 20, which are realised by a linear electric motor 22 directly driving the rail.

The linear electric motor 22 is thus an integral part of the movement device 50, while comprising a primary assembly 52 provided with at least one fixed truck 52a comprising coils supplied with an electric current. The trucks, here numbering two, are rigidly connected to the fixed central body of the wing, for example attached onto a front spar of this central body in the shape of a box, labelled 32 in FIG. 2.

Figure 5:
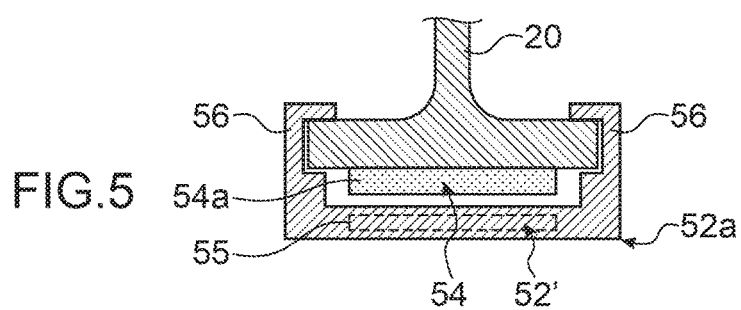
FIG. 5 shows a cross-sectional view taken along the line V-V of FIG. 3.

Moreover, the motor 22 comprises a mobile secondary assembly 54 comprising a magnetic pathway arranged on the drive rail 20. The permanent magnets 54a of this magnetic pathway are thus spaced apart from each other along the rail 20 onto which they are fastened. Consequently, contrary to the conventional realisations of the linear motors, it is the secondary assembly 54 comprising the magnetic pathway that is mobile, whereas the primary assembly 52 comprising the trucks remains stationary on the central body of the wing. As is visible in FIG. 5 in the cross-section, the permanent magnets 54a are arranged facing the portion 52' of the fixed trucks that comprises the coils 55.

Moreover, besides the movement of the rails carried out by the trucks equipped with coils, these same trucks 52a can be used as a guide during the rotation of the rails 20 with which these trucks cooperate. For example, each truck 52a can have rims 56 shaped to receive and guide the lateral ends of the flange of the rail. Alternatively, there are more conventional guide means, using rollers (not shown) fastened onto the central body 8 of the wing and pressed against the lateral surfaces of the flanges of the rail and the outer surfaces of the upper and lower flange of the rail.

It is noted that a plurality of drive rails 20 can be equipped with such a linear motor. Moreover, even if a representation with two trucks 52a was described, it is understood that a single truck 52a provided with a plurality of coils would be sufficient to ensure the driving. Inversely, a greater number of trucks 52a could be provided in association with each rail, without going beyond the context of the invention. There could also be a fixed truck ensuring the actuation and the guiding, and a second fixed truck only ensuring the guiding function. According to yet another alternative, there could be a fixed truck exclusively ensuring the actuation, combined with a conventional set of rollers ensuring the guiding of the various surfaces of the rail.

It is also noted that the retention of the device in the various deployed positions and in the retracted position is for example ensured either by the device 50 itself, or by additional devices controlled mechanically, electromechanically, electronically, magnetically, electromagnetically, etc.

Of course, various modifications can be made by a person skilled in the art to the invention that was just described, only as non-limiting examples.

What is claimed is:

1. An aircraft wing comprising a fixed central wing body, as well as at least one mobile leading edge flap intended to be moved relative to said fixed central body between a deployed deposition and a retracted position, the wing comprising a device for movement of the mobile leading edge flap, said device being equipped with at least one mobile drive rail comprising a front end connected to the mobile flap, wherein said movement device comprises a linear electric motor comprising:
   a primary assembly equipped with at least one fixed truck comprising coils, the primary assembly being rigidly connected to the fixed central body of the wing; and
   a mobile secondary assembly comprising a magnetic pathway arranged on the drive rail, the magnetic pathway including a plurality of permanent magnets attached to the drive rail, said permanent magnets being spaced from one another along the drive rail.

2. An aircraft comprising at least one wing according to claim 1.

3. The aircraft wing according to claim 1, wherein the at least one fixed truck includes a slot that receives a flange of the drive rail, said flange having a wall that faces the coils, and wherein the plurality of permanent magnets are attached to said wall of the drive rail.

4. The aircraft wing according to claim 3, wherein the at least one fixed truck includes rims shaped to receive lateral ends of the flange.

5. The aircraft wing according to claim 1, wherein the primary assembly comprises at least two fixed trucks spaced apart from each other along the mobile drive rail, wherein said drive rail is guided by the fixed truck, and wherein each of said at least two fixed trucks guides said drive rail.

* * * * *